(12) United States Patent
Lucero et al.

(10) Patent No.: US 10,298,838 B2
(45) Date of Patent: May 21, 2019

(54) METHOD AND APPARATUS FOR GUIDING MEDIA CAPTURE

(71) Applicant: Conversant Wireless Licensing S.a r.l., Luxembourg (LU)

(72) Inventors: Andres Lucero, Tampere (FI); Marion Boberg, Suinula (FI)

(73) Assignee: Conversant Wireless Licensing S.a .r.l., Luxembourg (LU)

( * ) Notice: Subject to any disclaimer, the term of this patent is extended or adjusted under 35 U.S.C. 154(b) by 0 days.

(21) Appl. No.: 16/116,026

(22) Filed: Aug. 29, 2018

(65) Prior Publication Data

US 2019/0014259 A1 Jan. 10, 2019

Related U.S. Application Data

(63) Continuation of application No. 15/357,834, filed on Nov. 21, 2016, now abandoned, which is a (Continued)

(51) Int. Cl.
*H04W 4/02* (2018.01)
*H04N 5/232* (2006.01)
*H04N 1/00* (2006.01)

(52) U.S. Cl.
CPC ..... *H04N 5/23222* (2013.01); *H04N 1/00127* (2013.01); *H04N 1/00183* (2013.01); *H04N 1/00244* (2013.01); *H04N 1/00323* (2013.01); *H04N 5/23216* (2013.01); *H04N 5/23293* (2013.01); *H04W 4/02* (2013.01); *H04M 2250/52* (2013.01); *H04N 2201/0039* (2013.01); *H04N 2201/0055* (2013.01); *H04N 2201/0084* (2013.01)

(58) Field of Classification Search
CPC ..... H04M 1/0264; H04M 2250/20–52; H04M 1/72555; H04M 2017/2575; H04N 5/225
See application file for complete search history.

(56) References Cited

U.S. PATENT DOCUMENTS

| 6,906,643 B2 | 6/2005 | Samadani et al. |
| 7,474,959 B2 | 1/2009 | Singh |

(Continued)

FOREIGN PATENT DOCUMENTS

WO 2006/120596 A2 11/2006

OTHER PUBLICATIONS

"HP Photosmart Digital Cameras—HP In-Camera Panorama Preview" (http://h71036.www7.jp.com/hho/downloads/HP_In_Camera_Panaorama_With_Preview.pdf).

*Primary Examiner* — Pakee Fang
(74) *Attorney, Agent, or Firm* — Conversant Wireless Licensing

(57) ABSTRACT

An approach is provided for the presentation of guidance information for capturing media content by a mobile device. Location information of the mobile device is acquired. A presentation is initiated of guidance information for capturing media content by the mobile device as part of a sequence of media contents. The guidance information is based on the location information and specifies distance and directional angle for the capture of the media content according to the sequence of media contents. Whether there is a deviation from guidance information is determined. A signal is generated to provide feedback relating to the determined deviation.

12 Claims, 12 Drawing Sheets

Related U.S. Application Data continuation of application No. 12/473,140, filed on May 27, 2009, now abandoned.

(56) References Cited

U.S. PATENT DOCUMENTS

| | | |
|---|---|---|
| 2002/0154812 A1 | 10/2002 | Chen et al. |
| 2006/0155761 A1 | 7/2006 | Van De Sluis et al. |
| 2006/0158520 A1 | 7/2006 | Funakura |
| 2006/0182437 A1* | 8/2006 | Williams ........... H04N 5/23238 396/429 |
| 2008/0126961 A1 | 5/2008 | Naaman et al. |
| 2008/0180550 A1* | 7/2008 | Gulliksson ............. H04N 5/232 348/231.99 |
| 2009/0015702 A1 | 1/2009 | Garcia |
| 2009/0162042 A1 | 6/2009 | Wexler et al. |
| 2010/0033553 A1* | 2/2010 | Levy ........................ G06K 9/20 348/36 |
| 2010/0194851 A1* | 8/2010 | Pasupaleti ............. G06T 3/4038 348/36 |
| 2010/0215250 A1* | 8/2010 | Zhu ........................ G06T 17/05 382/154 |
| 2010/0232703 A1 | 9/2010 | Aiso |
| 2010/0295971 A1* | 11/2010 | Zhu ................... H04N 1/00204 348/240.99 |
| 2010/0304720 A1 | 12/2010 | Lucero et al. |
| 2017/0134646 A1 | 5/2017 | Lucero et al. |

* cited by examiner

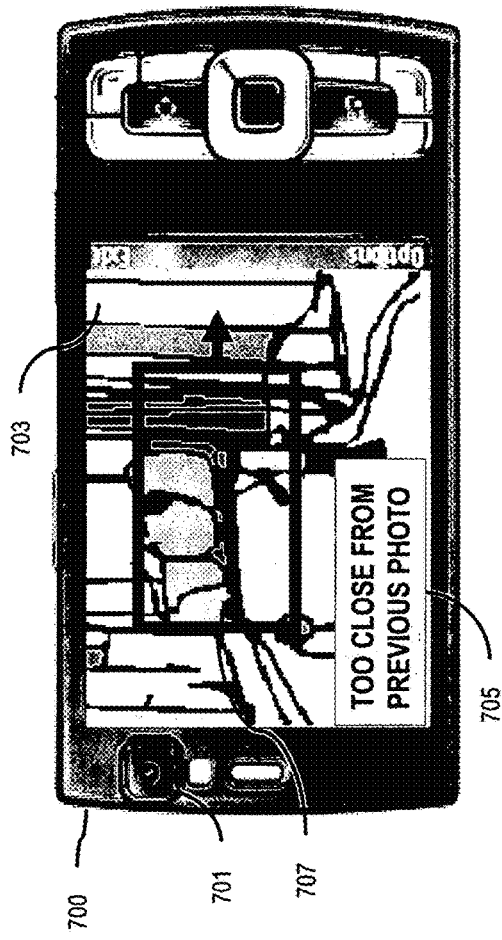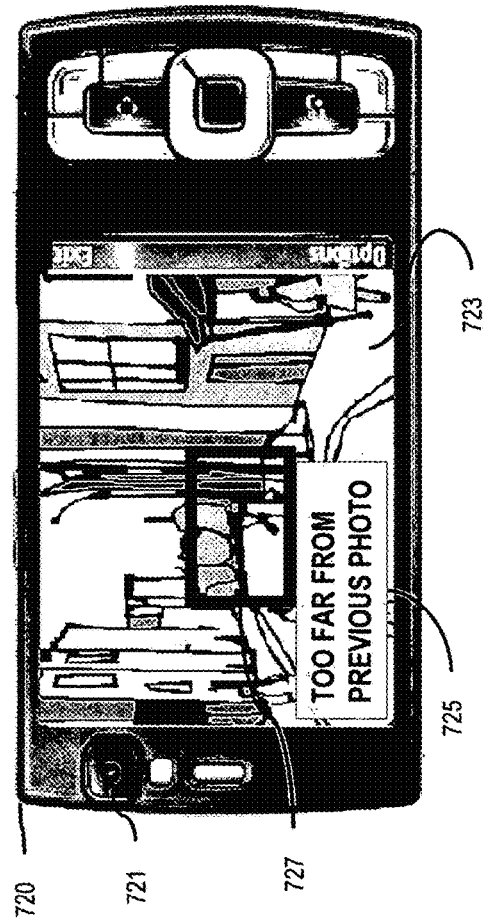
FIG. 7A
FIG. 7B

METHOD AND APPARATUS FOR GUIDING MEDIA CAPTURE

CROSS-REFERENCE TO RELATED APPLICATIONS

This application is a continuation of U.S. patent application Ser. No. 15/357,834, filed on Nov. 21, 2016, which is a continuation of U.S. patent application Ser. No. 12/473,140, filed on May 27, 2009. The above-identified application is herein incorporated by reference in its entirety.

BACKGROUND

Service providers (e.g., cellular) and device manufacturers are continually challenged to deliver value and convenience to consumers by, for example, providing compelling network services, applications, and content, as well as user-friendly devices. Important differentiators in this industry are application and network services. In particular, entertainment services, such as media capture and observation, are useful and convenient for a user. Virtual worlds have been created using the capture of photos. Traditionally, the capture of images to create virtual worlds has been limited to image capture directed by an individual.

SOME EXAMPLE EMBODIMENTS

Therefore, there is a need for an approach for guiding media capture by a device.

According to one embodiment, a method comprises acquiring location information of a mobile device. The method also comprises initiating presentation of guidance information for capturing media content by the mobile device as part of a sequence of media contents, wherein the guidance information is based on the location information and specifies distance and directional angle for the capture of the media content according to the sequence of media contents. The method further comprises determining whether there is deviation from the guidance information, and generating a signal to provide feedback relating to the determined deviation.

According to another embodiment, an apparatus comprising at least one processor, and at least one memory including computer program code, the at least one memory and the computer program code configured to, with the at least one processor, cause the apparatus to acquire location information of a mobile device. The apparatus is also caused to initiate presentation of guidance information for capturing media content by the mobile device as part of a sequence of media contents, wherein the guidance information is based on the location information and specifies distance and directional angle for the capture of the media content according to the sequence of media contents. The apparatus is further caused to determine whether there is deviation from the guidance information, and generate a signal to provide feedback relating to the determined deviation.

According to another embodiment, a computer-readable storage medium carrying one or more sequences of one or more instructions which, when executed by one or more processors, cause an apparatus to acquire location information of a mobile device. The apparatus is also caused to initiate presentation of guidance information for capturing media content by the mobile device as part of a sequence of media contents, wherein the guidance information is based on the location information and specifies distance and directional angle for the capture of the media content according to the sequence of media contents. The apparatus is further caused to determine whether there is deviation from the guidance information, and generate a signal to provide feedback relating to the determined deviation.

According to another embodiment, an apparatus comprises means for acquiring location information of a mobile device. The apparatus also comprises means for initiating presentation of guidance information for capturing media content by the mobile device as part of a sequence of media contents, wherein the guidance information is based on the location information and specifies distance and directional angle for the capture of the media content according to the sequence of media contents. The apparatus further comprises means for determining whether there is deviation from the guidance information and means for generating a signal to provide feedback relating to the determined deviation.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7A and FIG. 7B are diagrams of user interfaces utilized in the process of FIG. 4, according to various embodiments;

DESCRIPTION OF PREFERRED EMBODIMENT

A method, apparatus, and software for guiding media capture by a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices, it is contemplated that the approach described herein may be used with other devices and applications.

Figure 1:
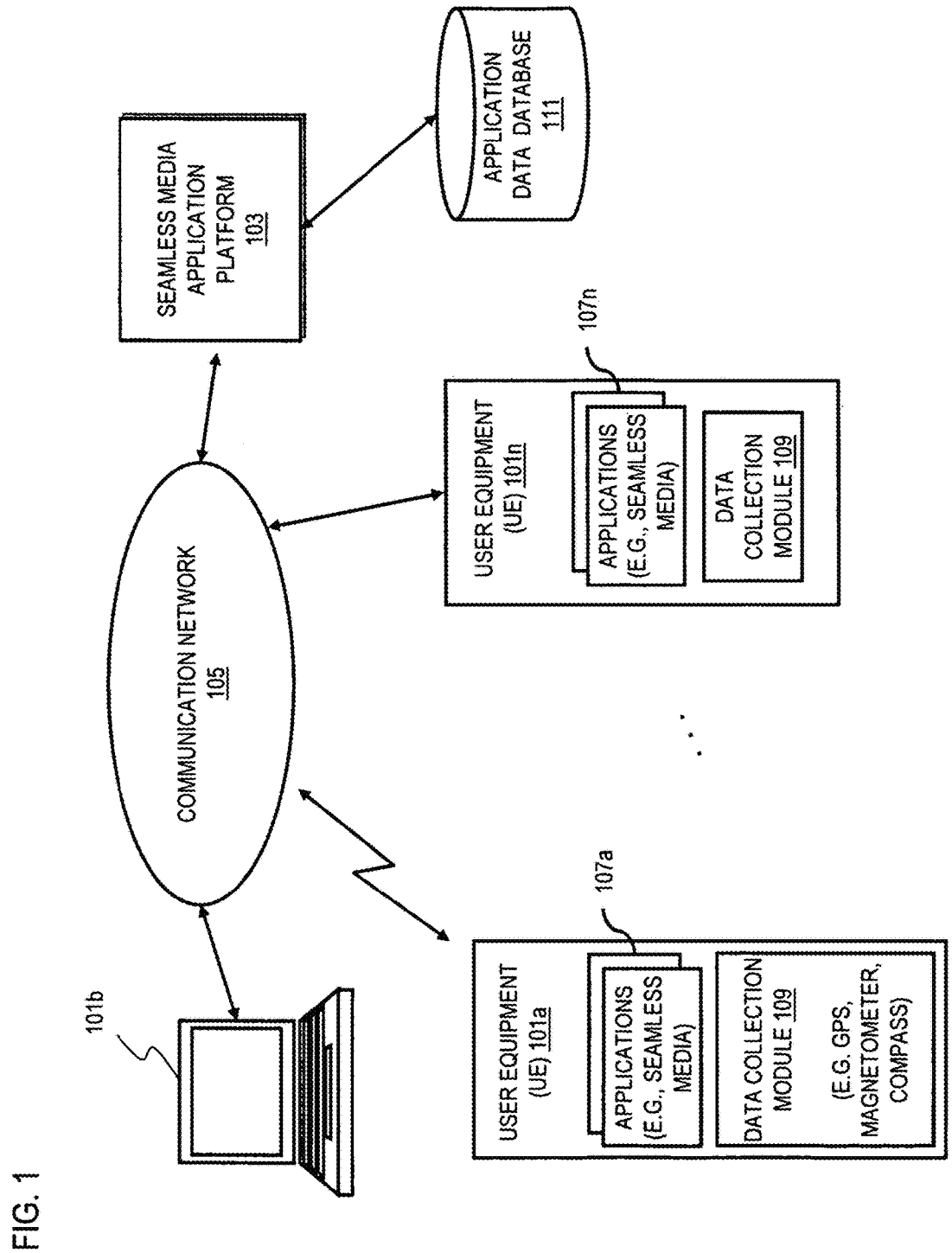
FIG. 1 is a diagram of a system capable of guiding media capture by a device, according to one embodiment.

FIG. 1 is a diagram of a system capable of guiding media capture by a device, according to one embodiment. In a mobile world, increasing services and applications can utilize media capture devices to capture media (e.g., photos or video clips). However, these devices are made to generally capture single instances of actions, not to form sequences of media content that are capable of being combined into a seamless virtual environment. Thus, it is difficult for an individual with a device to capture a series of media content to seamlessly create a virtual environment.

To address this problem, a system 100 of FIG. 1 introduces the capability to guide media capture of devices to create content that can be experienced as a seamless media sequence. A user equipment (UE) 101 can be used by a user to capture media content (e.g., photographs) and send the media to a seamless media application platform 103 via a communication network 105. The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may use an application 107, such as a seamless media application 107a-107n, to receive guidance information for capturing media content via a data collection module 109. The data collection module 109 can capture media content (e.g., images, sound, etc.) as well as location information (e.g., global positioning system (GPS), magnetometer, and compass).

In one embodiment, a seamless media application platform 103 can receive captured media to process and create a media presentation. The seamless media application platform 103 can store this content in an application data database 111. A UE 101b can then view the media presentation by accessing the seamless media application platform 103 via an application 107.

According to one embodiment, the UE 101 captures an image to begin a sequential scene or path. In one embodiment, a scene is a location-based sequence of media content. In another embodiment, a path is a location-based sequence of media content following a route. In this embodiment, media contents can later be spatially connected together to provide an immersive experience to users. When the image is captured, additional sensor data is collected, including GPS coordinates, magnetometer and/or compass data, and/or accelerometer data. The sensor data can be embedded in the image metadata to facilitate composition of an immersive presentation of the media content. Additionally, the metadata can be used to generate instructions on capturing media to create an immersive sequential presentation.

By way of example, the communication network 105 of system 100 includes one or more networks such as a data network (not shown), a wireless network (not shown), a telephony network (not shown), or any combination thereof.

It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

In this example, the UE 101 and a seamless media application platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
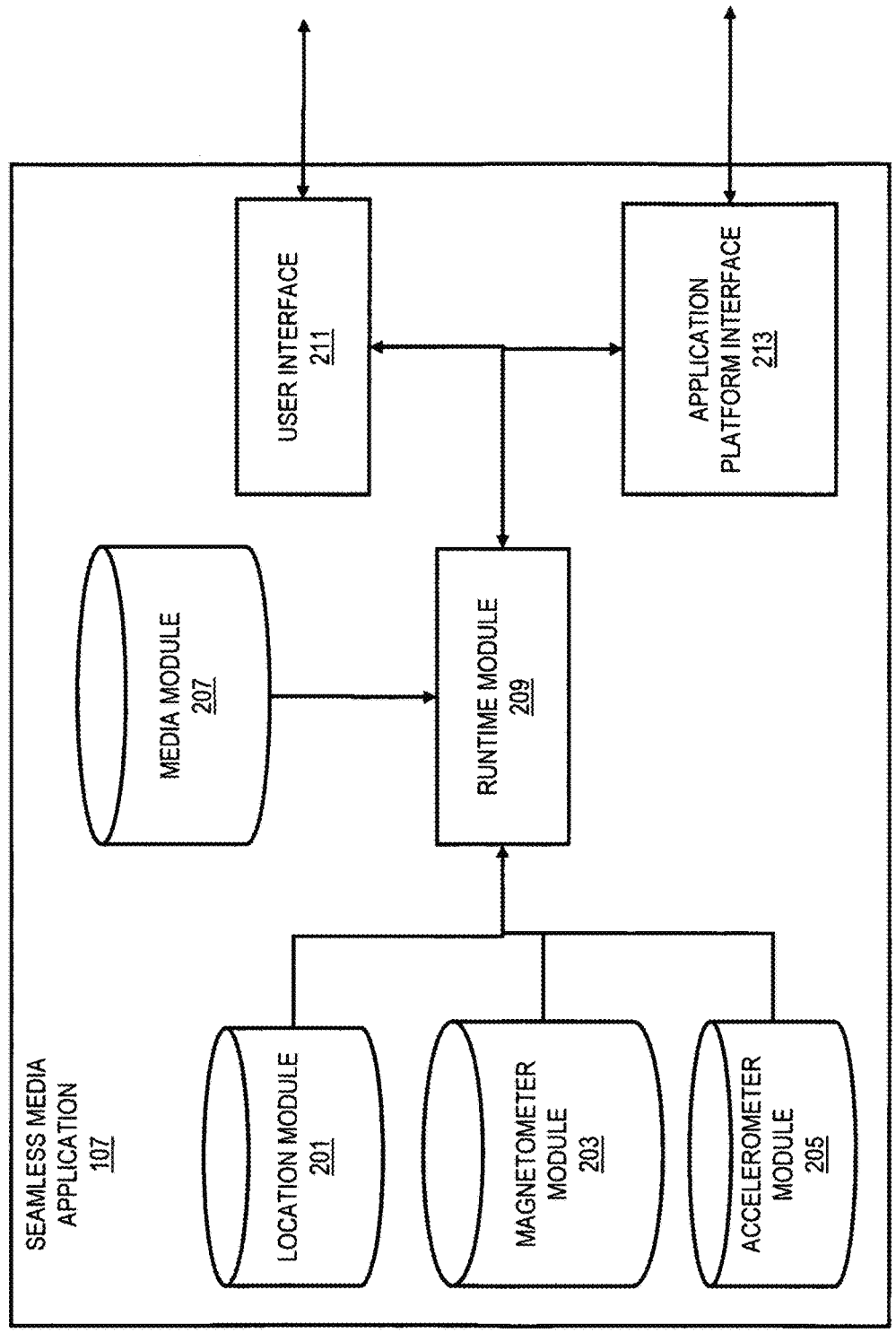
FIG. 2 is a diagram of the components of a seamless media application, according to one embodiment.

FIG. 2 is a diagram of the components of a seamless media application 107, according to one embodiment. By way of example, the seamless media application 107 includes one or more components for providing guidance for capturing media content as part of a sequence of media contents that can be combined together based on spatial relationships. It is contemplated that the functions of these components may be combined in one or more components or performed by other components of equivalent functionality. In this embodiment, the seamless media application 107 includes a location module 201, a magnetometer module 203, an accelerometer module 205, a media module 207, a runtime module 209, a user interface 211, and an application platform interface 213.

In one embodiment, a seamless media application 107 includes a location module 201. This location module 201 can determine a user's location. The user's location can be determined by a triangulation system such as GPS, A-GPS, Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. GPS coordinates can give finer detail as to the location of the UE 101 when media is captured. In one embodiment, GPS coordinates are embedded into the metadata of captured media to facilitate the media capturing guidance.

In one embodiment, a seamless media application 107 includes a magnetometer module 203. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is embedded into the metadata of captured media to facilitate in media capture guidance.

In one embodiment, a seamless media application 107 includes an accelerometer module 205. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module can determine the angle the UE 101 is pointed as compared to Earth's gravity. In one embodiment, vertical directional data obtained from an accelerometer is embedded into the metadata of captured media to help facilitate the guidance of media capture.

In some embodiments, a seamless media application 107 includes a media module 207. Media can be captured using a camera, an audio recorder, or other media capture device. In one embodiment, media is captured in the form of an image. The media module 207 can obtain the image from a camera and embed the image with metadata containing location and orientation data. The media module 207 can also capture images using a zoom function. If the zoom function is used, media module 207 can embed the image with metadata regarding the zoom lens. A runtime module 209 can process the metadata information to determine a set of rules for additional media in a sequence of media capture.

In one embodiment, a seamless media application 107 includes a user interface 211. The user interface 211 can include various methods of communication. For example, the user interface 211 can have outputs including a visual component (e.g., a screen), an audio component (e.g., a verbal instructions), a physical component (e.g., vibrations), and other methods of communication. User inputs can include a touch-screen interface, a scroll-and-click interface, a button interface, etc. A user can input a request to start or continue seamless media capture via the user interface 211. The UE 101 can then provide multimodal feedback to offer user guidance on the user's actions.

In one embodiment, a seamless media application 107 includes a runtime module 209. The runtime module 209 receives an input from a user interface 211 to provide media capture guidance. The runtime module 209 can then receive an input to begin a new sequence of data capture. In one embodiment, the user captures an image. Once the image capture takes place, the runtime module 209 can process data received during the image capture to determine a set of rules for the next image in the series of image captures. The set of rules can be based on location data from a location module 201, horizontal angle data from a magnetometer module 203, vertical angle data from an accelerometer module 205, or the like. Once a second image is captured, the rules can be refined to create a path or a scene. In the embodiment of creating a path, a revised set of rules can provide that the next image or other media capture in the sequence would occur along the path.

In one embodiment, a seamless media application 107 includes an application platform interface 213. The application platform interface 213 is used by the runtime module 209 to communicate with a seamless media application platform 103. In some embodiments, the interface is used to upload media for processing at the seamless media application platform 103.

Figure 3:
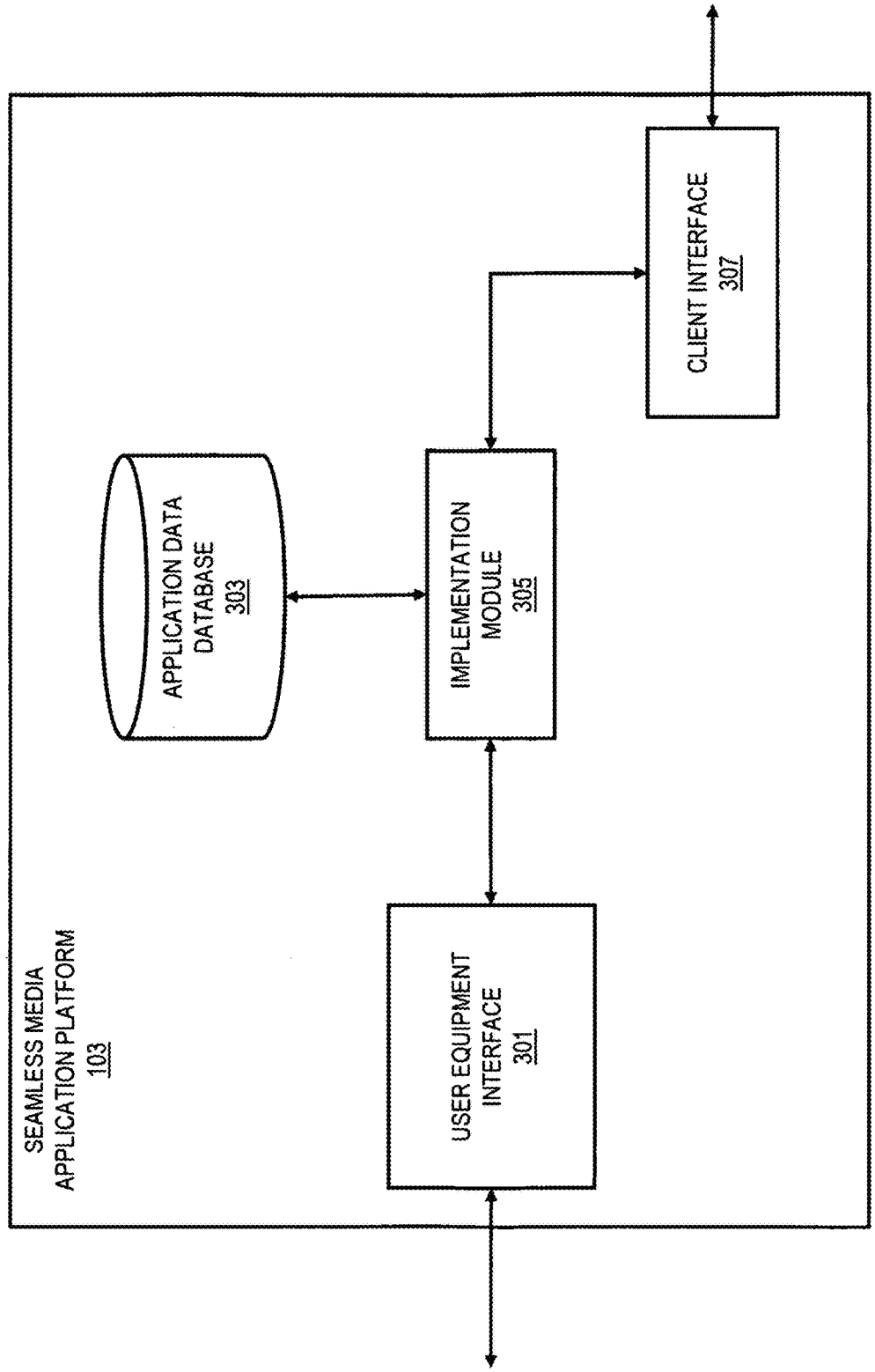
FIG. 3 is a diagram of the components of a seamless media application platform, according to one embodiment.

FIG. 3 is a diagram of the components of a seamless media application platform 103, according to one embodiment. By way of example, the seamless media application platform 103 includes one or more components for providing media sequence guidance to a UE 101 and displaying a scene or path in a virtual environment. It is contemplated that the functions of these components may be combined in one or more components or performed by other components of equivalent functionality. In one embodiment, the seamless media application platform 103 includes a user equipment interface 301, an application data database 303, an implementation module 305, and a client interface 307. In this embodiment, the implementation module 305 receives communications (e.g., media content) from a UE 101 via a user equipment interface 301. The implementation module can store appropriate communications such as media content (e.g., photos, videos, sounds, etc.) along with their corresponding location and orientation in an application data database 303. A user can then request to view a seamless media experience via a separate client interface 307 or the user equipment interface 301. A three-dimensional virtual world can be created on the seamless media application platform 103 by placing the geo-tagged media content in a spatial relationship with each other. This creates a virtual world that is a representation of the real world to the extent covered by the media content. In one embodiment, a user can move in the virtual world using avatars. In another embodiment, a user can experience the virtual world by browsing scenes or paths of photos, video clips, and other media. The browsing can be used to provide an immersive experience similar to navigating or flying through the three-dimensional world from one media item to the next. Various technologies (e.g., television, monitor, mobile handset, stereo, computer, etc.) can be used to display the media experience.

Figure 4:
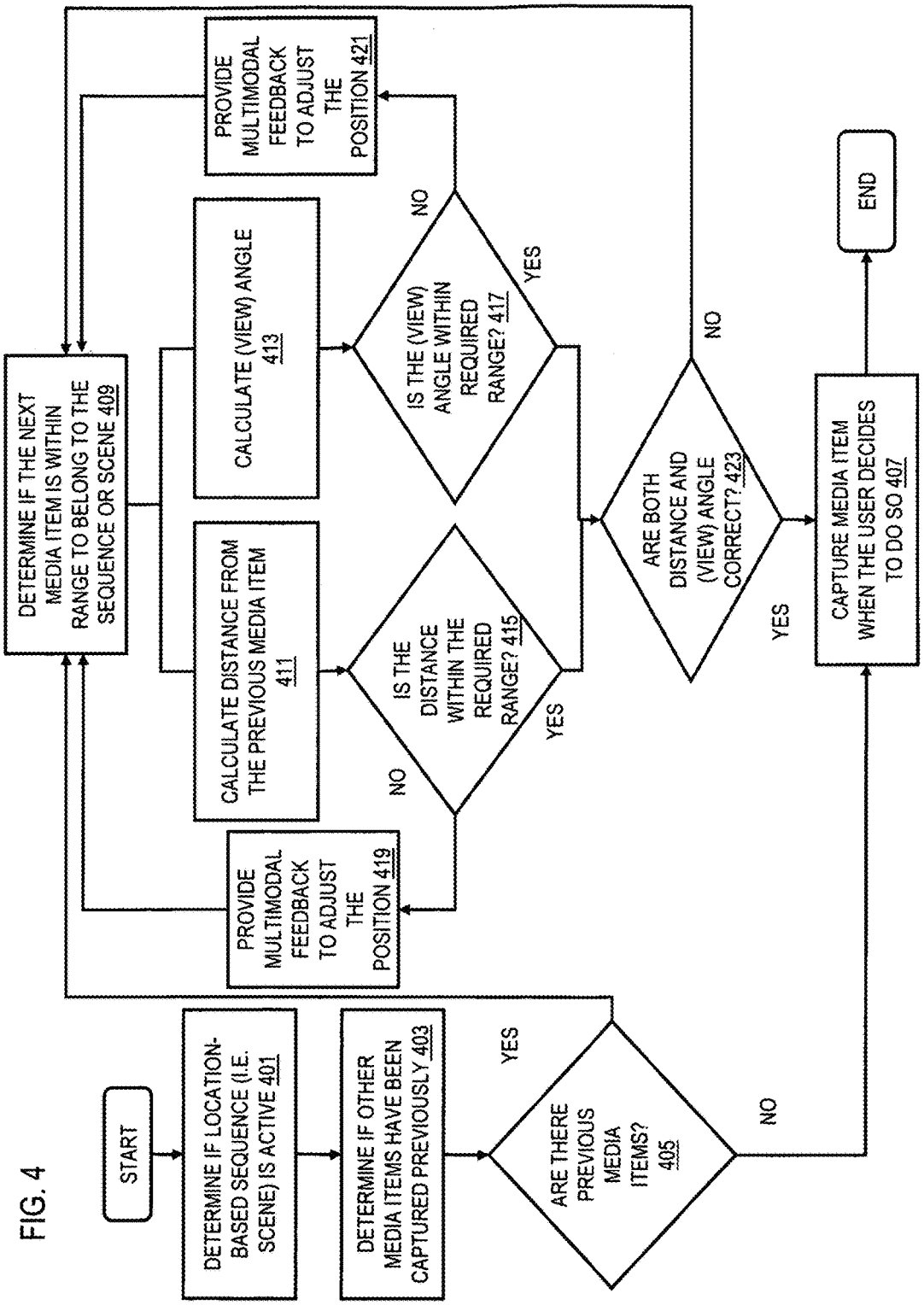
FIG. 4 is a flowchart of a process for guiding the capture of media content, according to one embodiment.

FIG. 4 is a flowchart of a process for guiding the capture of media content, according to one embodiment. In one embodiment, a runtime module 209 of a seamless media application 107 performs the process 400 and is implemented in, for instance, a chip set including a processor and a memory as shown FIG. 11. At step 401, the runtime module 209 determines if the seamless media application 107 is in an active mode to capture a location-based sequence. A user can select via a user interface 211 modes of operation of the seamless media application 107.

At step 403, the runtime module 209 determines if a new sequence (e.g., a scene or a path) is being started or if items in the sequence have been previously captured. Thus, a user can continue a sequence started at a different time or day and incorporate those media objects into the sequence to be experienced. A user can input via a user interface 211 if the user wishes to start a new sequence. In one embodiment, the runtime module 209 can help determine if a sequence has been started. The runtime module 209 can query a location module 201 to determine the current position of a UE 101 running the seamless media application 107. The runtime module 209 can then query a media module 207 to determine if media in the media module 207 is within a certain range of the current location. If there is such media present, the runtime module 209 can inform the user of a potential sequence previously started. At step 405, a determination is made as to whether there are previous media items in the sequence. If there are no previous media items, at step 407 a media item is captured at the will of the user.

If there are previous media items present in the sequence, at step 409 the runtime module 209 determines if the media item to be captured is within the correct range to belong to the sequence. At step 411, the runtime module 209 queries the location module 201 and media module 207 to determine the distance of the current UE 101 position compared to the existing media items. At step 413, the runtime module 209 queries the magnetometer module 203, accelerometer module 205, and media module 207 to determine if the UE 101 is in a proper viewing angle to create the next media item in the sequence. The proper distance and angle ranges can be set by a preset profile. The preset profile may be customized to user preferences and situations. For example, a media experience of following an outdoor path would have a longer range between media items than a media experience following an indoor path. In one embodiment, a required distance range is between 40 and 100 meters, while a required horizontal viewing angle is between 0 and 60 degrees. In one path embodiment, the media content to be captured has a trajectory that is in common with the sequence of media contents. Thus, the distance can have a direction that does not deviate by a predetermined parameter from the trajectory. At steps 415 and 417, it is determined whether the proper distance and angle ranges are met.

If proper distance and angle ranges are not met by the UE 101, at steps 419 and 421, the runtime module provides multimodal feedback to the user to adjust the position of the UE 101 to suitably capture media for use in a sequence. The multimodal feedback (e.g., verbal instructions, visual cues, vibrations, etc.) can help a user adjust the position of the UE 101 to capture a media item that is part of a sequence to create an immersive experience when viewed. In one embodiment, vibrations are sent via the UE 101 until the UE 101 is within an acceptable angular range. In another embodiment, visual boxes can be used to communicate the proper positioning of the UE 101. The runtime module 209 returns to step 409 to again determine proper UE 101 positioning to capture the next media item. If, at steps 415, 417, and 423, it is determined that both the distance and view angle are correct, the user is able to capture the media item at the user's will at step 407.

With the above approach, a user is given guidance to accurately capture a sequence of media content that when combined can produce a seamless virtual experience. In this manner, the user is guided so the user need not count steps and read a compass while capturing media. Thus, this approach guides the user to capture a media item sequence with little effort in calculating possible variables in determining the spatial relationships between media items during the media capturing process.

Figure 5:
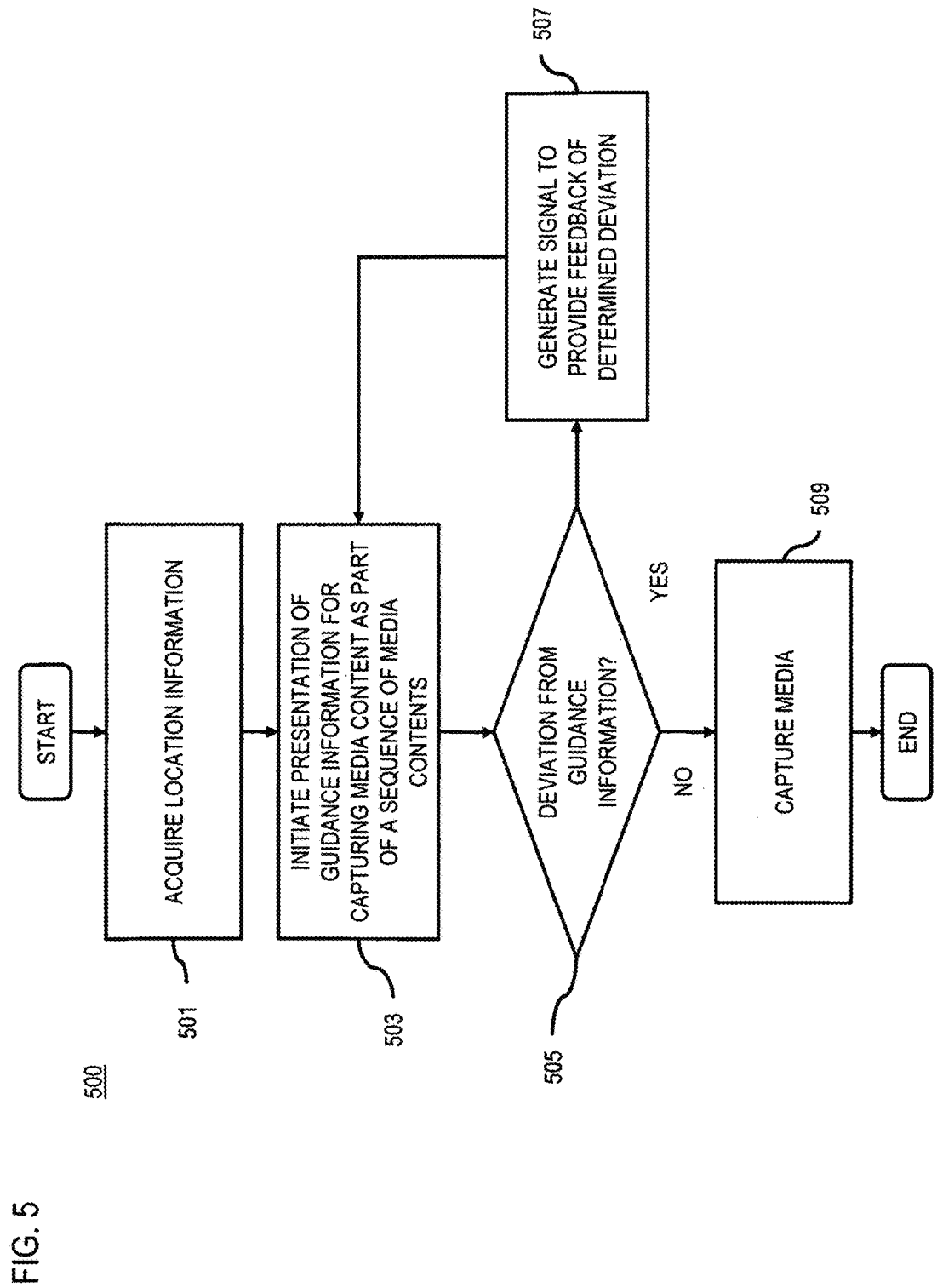
FIG. 5 is a flowchart of a client process of guiding the capture of media content, according to one embodiment.

FIG. 5 is a flowchart of a client process of guiding the capture of media content, according to one embodiment. In one embodiment, the runtime module 209 of the seamless media application 107 performs the process 500 and is implemented in, for instance, a chip set including a processor and a memory as shown FIG. 11. At step 501, the runtime module 209 acquires location information about a UE 101, such as a mobile device. The information can be gathered via various sensors (e.g., a location sensor, a magnetometer sensor, an accelerometer sensor, etc.) and can be used to determine the location and orientation of the UE 101.

At step 503, the runtime module 209 initiates a presentation of guidance information for capturing media content by the mobile device as part of a sequence of media contents that can later be combined together. In one embodiment, the guidance information is based on the location information and specifies distance and directional angle for the capture of the media content according to the sequence of media contents. In one embodiment, media content includes a digital image, a video clip, or an audio clip. In this embodiment, a digital camera, a digital camcorder, or a microphone can be used to capture the media content. In one embodiment, the sequence of media contents forms a path (e.g., a location based sequence of media content following a route creating a scene, etc.). In one embodiment, to determine guidance information, the current location information can be used in conjunction with location information of a previously captured media item to calculate distance and orientation parameters of the next media item to be captured in the media capture sequence. In another embodiment, one or more of the distance and orientation parameters can be associated with a digital camera. Metadata can be generated to specify the parameters and incorporated in captured media content.

At step 505, the runtime module 209 determines if there has been a deviation from the guidance information. If there has been a deviation from the guidance information, at step 507, the runtime module generates a signal to provide feedback relating to the determined deviation. The feedback can help a user correct the deviation by initiating the presentation of guidance information. In one embodiment, the feedback signal notifies the user of the mobile device to move in conformance with the guidance information. For example, the verbal instruction can be given to move forward five meters or to turn towards the left. In another embodiment, the feedback signal initiates the generation of a text message, a voice command, a vibration, or a combination of communication methods to instigate the user to move in conformance with the guidance information. At step 509, when the UE 101 location and orientation are within guidance parameters, a media item belonging to the sequence is captured.

With the above approach, a user is presented guidance to conveniently capture a sequence of media content that when combined together can produce a seamless virtual experience. In this manner, the user is instructed so the user need not capture media through trial and error or effortful calculations. Thus, this approach guides the user through the media capture process to prepare a sequence of media to create an immersive virtual experience.

Figure 6:
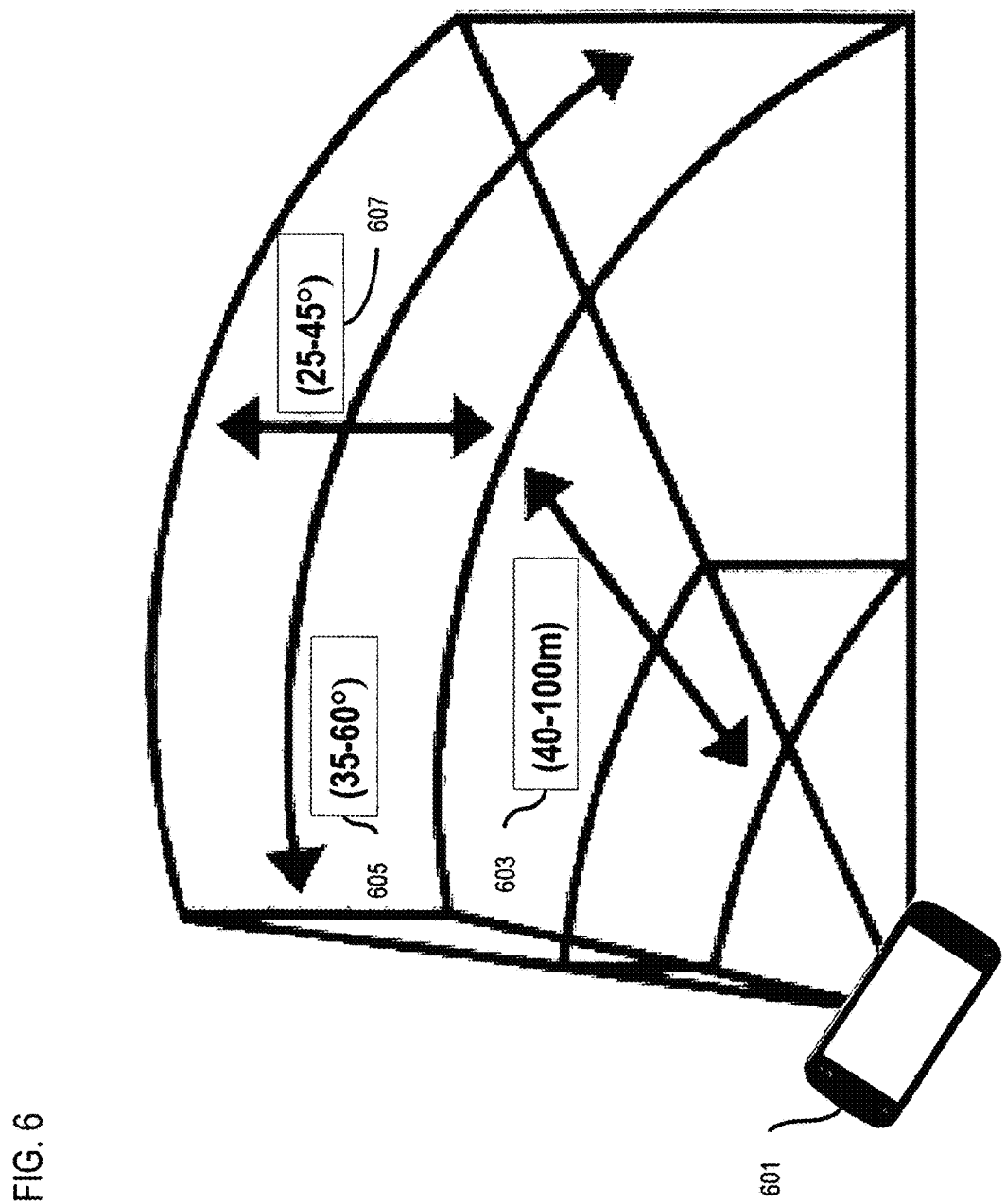
FIG. 6 is a diagram of distance and angle information of a user equipment for guiding the capture of media content, according to one embodiment.

FIG. 6 is a diagram of distance and angle information of a UE 601 for guiding the capture of media content, according to one embodiment. In one embodiment, the sequence of media content to be captured includes a path with a trajectory. The guidance information can be set to a profile to create an immersive path experience when the media content are combined together. In one embodiment, the profile is set so that each captured media item follows a certain trajectory and each captured media item is a distance 603 of, e.g., 40 to 100 meters apart. In this embodiment, the horizontal trajectory and orientation of the media sequence is between 35 and 60 degrees 605. Thus, a user can be instructed to move to a position within the guidance parameters and angle the media capture device to a certain orientation to capture the media item. Additionally, the guidance information can include a vertical angle 607 of between 25 and 45 degrees. A vertical angle 607 includes the capacity of the user to point the media capture device up or down while following the trajectory. In one embodiment, parameters can be set to guide a user to move towards or away from a media object, point the media capture device up, down, left, or right, or a combination thereof. Thus, when a user is too close or too far from the previous media item, the UE 601 provides multimodal feedback to indicate the users actions to correct the deviance from the parameters.

FIG. 7A is a diagram of a user interface utilized in the process of FIG. 4, according to one embodiment. FIG. 7A shows a user interface 700, including a camera 701 to capture images. In this embodiment, during the capture of a sequence of images, the user attempts to capture an image 703 that is too close to a previous image. Guidance information 705 instructs the user to move away from the image object via a visual cue 707 (e.g., a guide box, a blinking dot, etc.). Once the user and camera 701 is a proper distance away from the media object, the visual cue 707 is removed and the user can capture the image.

FIG. 7B is a diagram of a user interface utilized in the process of FIG. 4, according to one embodiment. FIG. 7B displays a user interface 720, including a camera 721 to capture images and video. In this embodiment, a user endeavors to capture an image 723 that is too far from the previous image in a media sequence. A guidance presentation 725 guides the user to move closer to the image object via a visual signal 727. Once the user and camera 721 are within the parameters set by the seamless media application 107, the user can capture an image. If the user does not wish to or is unable to move to a location within the parameters, the seamless media application 107 can automatically compensate for the difference in parameters by using a digital or optical zoom feature. The seamless media application 107 can extrapolate a new location point to embed in metadata by using zoom magnification, orientation, and original location data.

Figure 8:
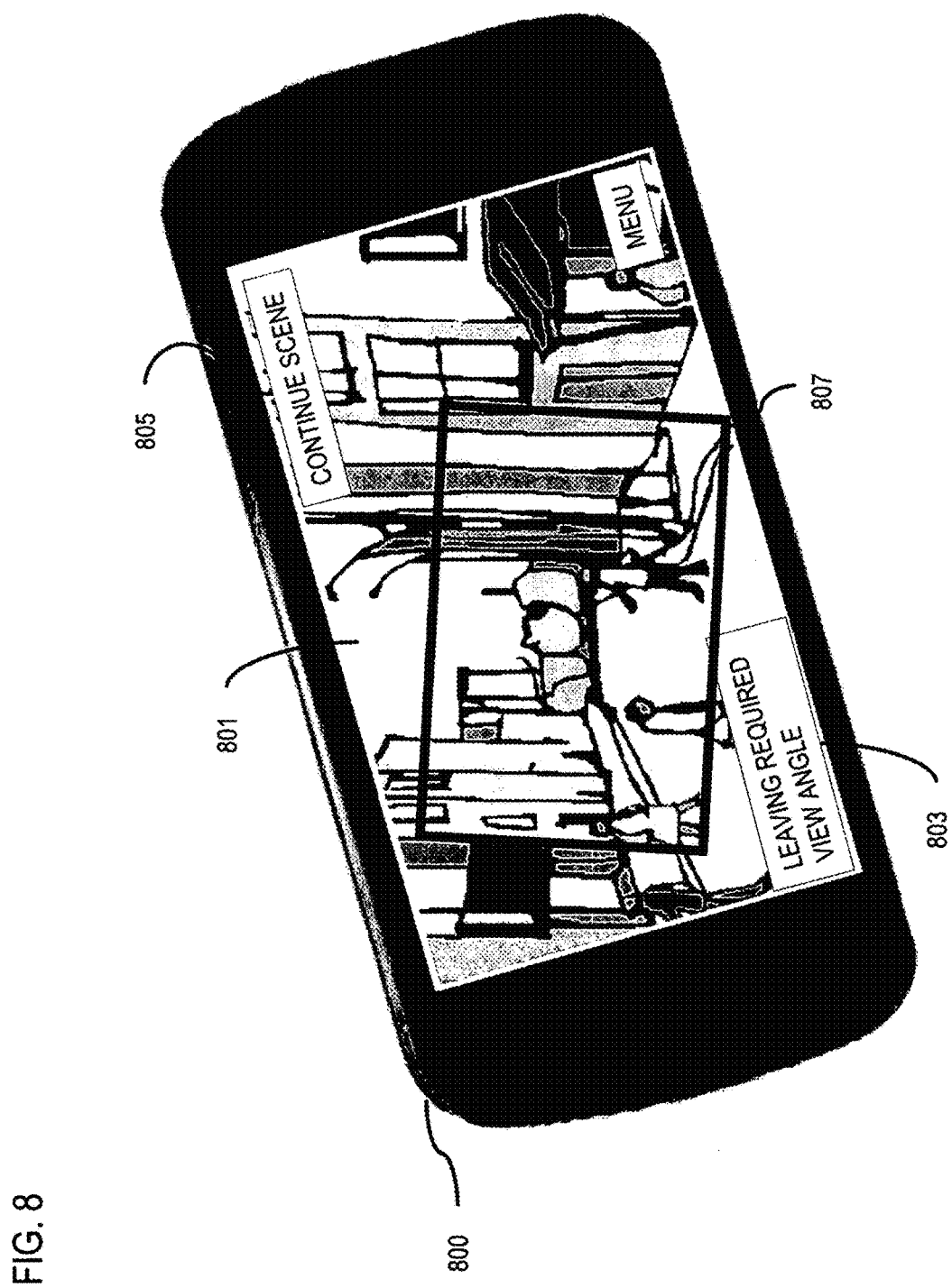
FIG. 8 is a diagram of a user interface utilized in the process of FIG. 4, according to one embodiment.

FIG. 8 is a diagram of a user interface utilized in the process of FIG. 4, according to one embodiment. FIG. 8 displays a user interface 800 to capture images and video of scenes. In this embodiment, a user attempts to capture an image 801 that is not within the required parameters of a scene. A guidance presentation 803 informs the user that the user is leaving the required view angle to continue the scene 805. The user is informed via a box diagram 807 of an optimal angle within the parameters of the scene. Additionally, the user can be informed of the improper angle by a vibration on one side of the interface 800 (not shown) or audible communication (not shown). When the user interface 800 enters a viewing angle within the required parameters, the user can capture an image or video of the media object. In one embodiment, the seamless media application 107 can also compensate for the angle by cropping the image based on the guidance information. In this embodiment, a zoomed in view of the media object should be within the guidance parameters. The seamless media application 107 can extrapolate a new location point to embed in metadata of the zoomed in view by using zoom magnification, accelerometer, orientation, and original location data.

Figure 9:
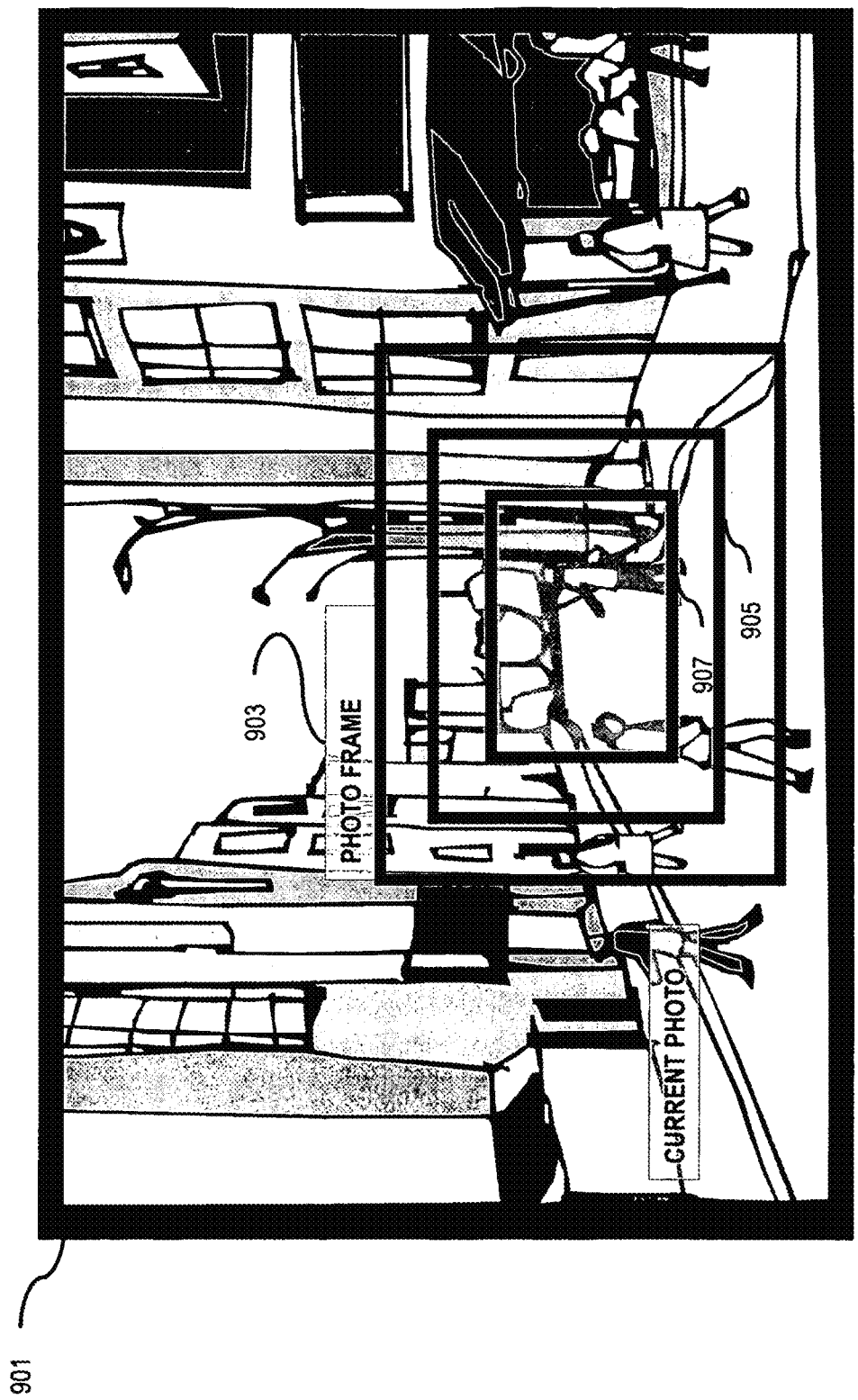
FIG. 9 is a diagram of a user interface utilized in the process of viewing captured media content, according to one embodiment.

FIG. 9 is a diagram of a user interface utilized in the process of viewing captured media content, according to one embodiment. In this embodiment, an image 901 is the first image captured in the sequence. Frames are displayed to represent media objects that are available for viewing in the virtual environment. One frame can be a photo frame 903 displaying an image (e.g., a busy street). Another frame can be a video frame 905 displaying a video stream (e.g., a man walking across the street) when activated. Yet another frame can be an audio frame 907 of a sound (e.g., birds chirping) taken at the location. Thus, a user can be immersed in a seamless media experience captured by the user.

The processes described herein for providing guidance for capturing seamless media may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
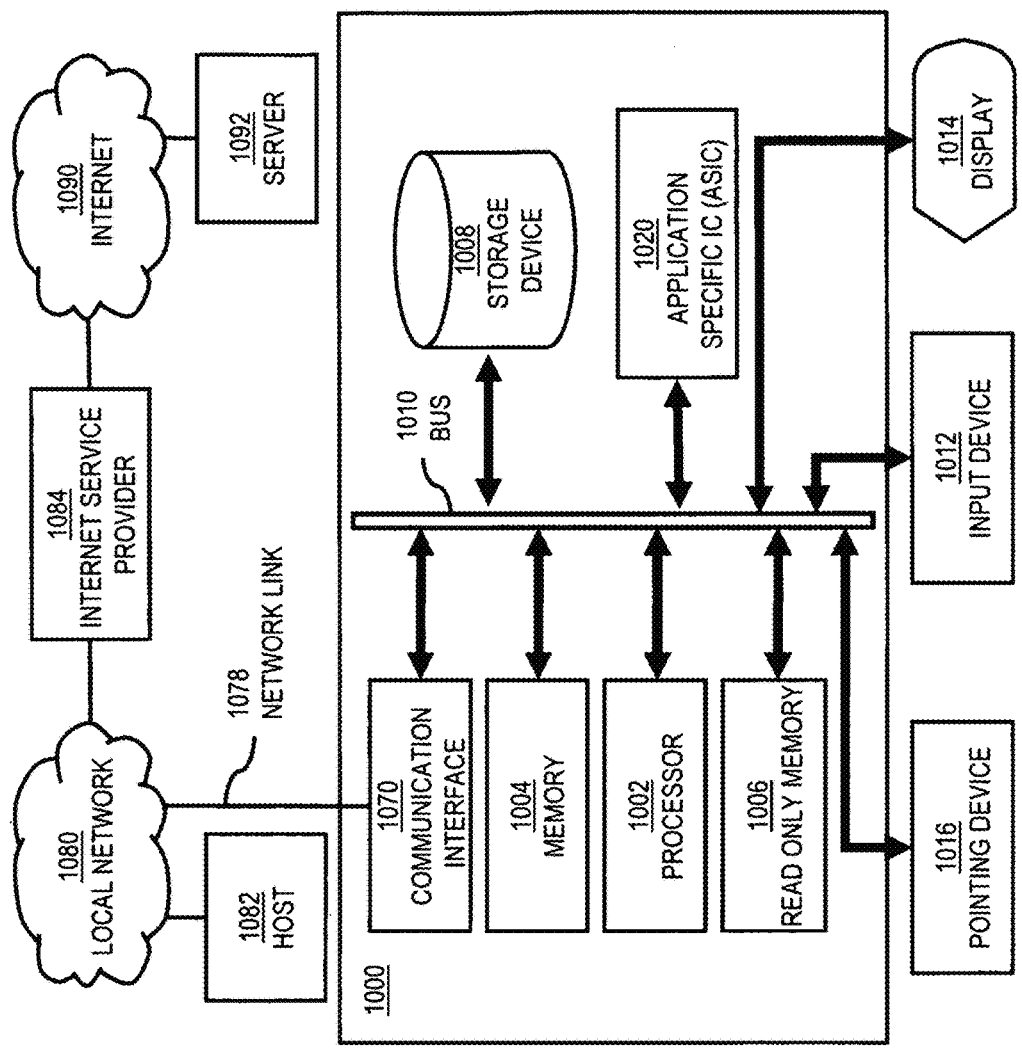
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to guide the capturing seamless media as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to guiding the capturing of seamless media. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for guiding the capturing of seamless media. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for guiding the capture of seamless media, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 to the UE 101.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 11:
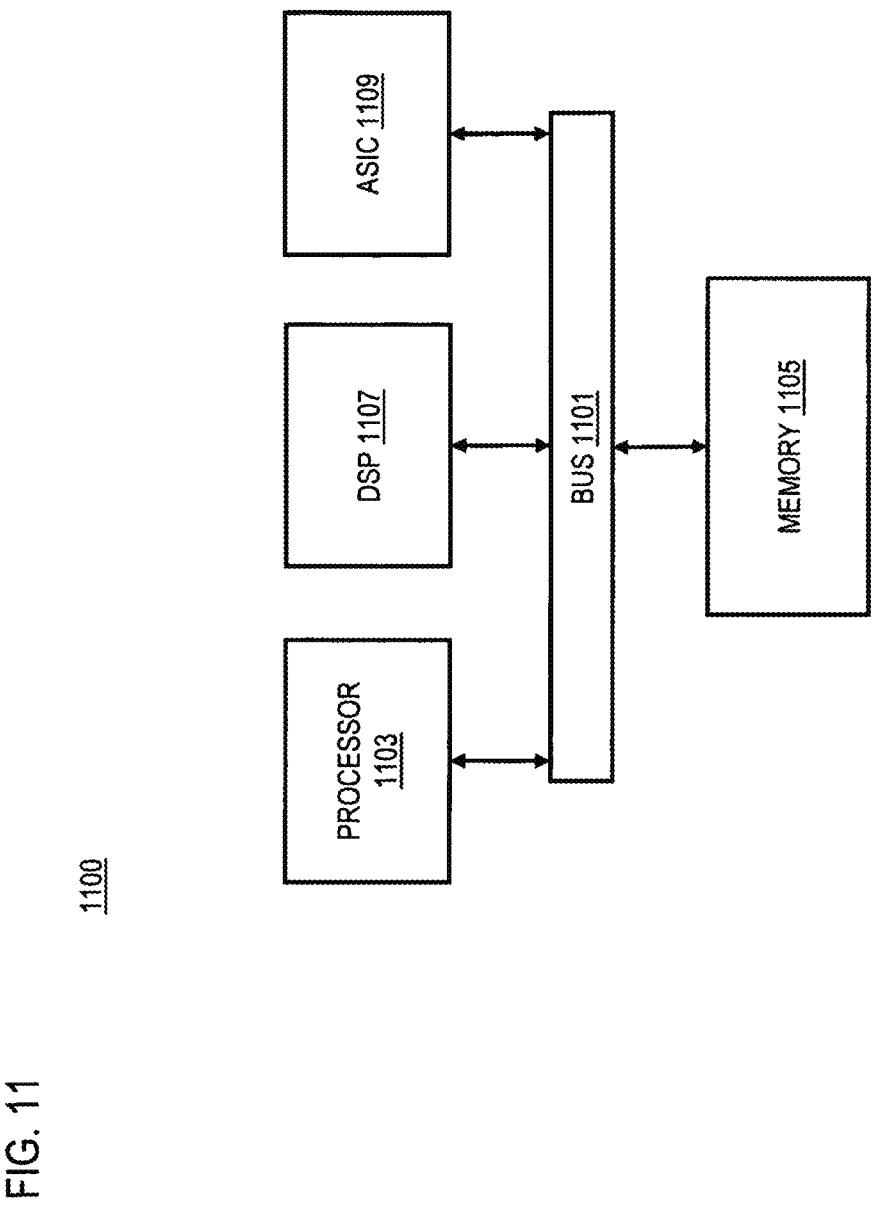
FIG. 11 is a diagram of a chip set that can be used to implement an embodiment of the invention.

FIG. 11 illustrates a chip set 1100 upon which an embodiment of the invention may be implemented. Chip set 1100 is programmed to guide the capturing of seamless media as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to guide the capturing of seamless media. The memory 1105 also stores the data associated with or generated by the execution of the inventive steps.

Figure 12:
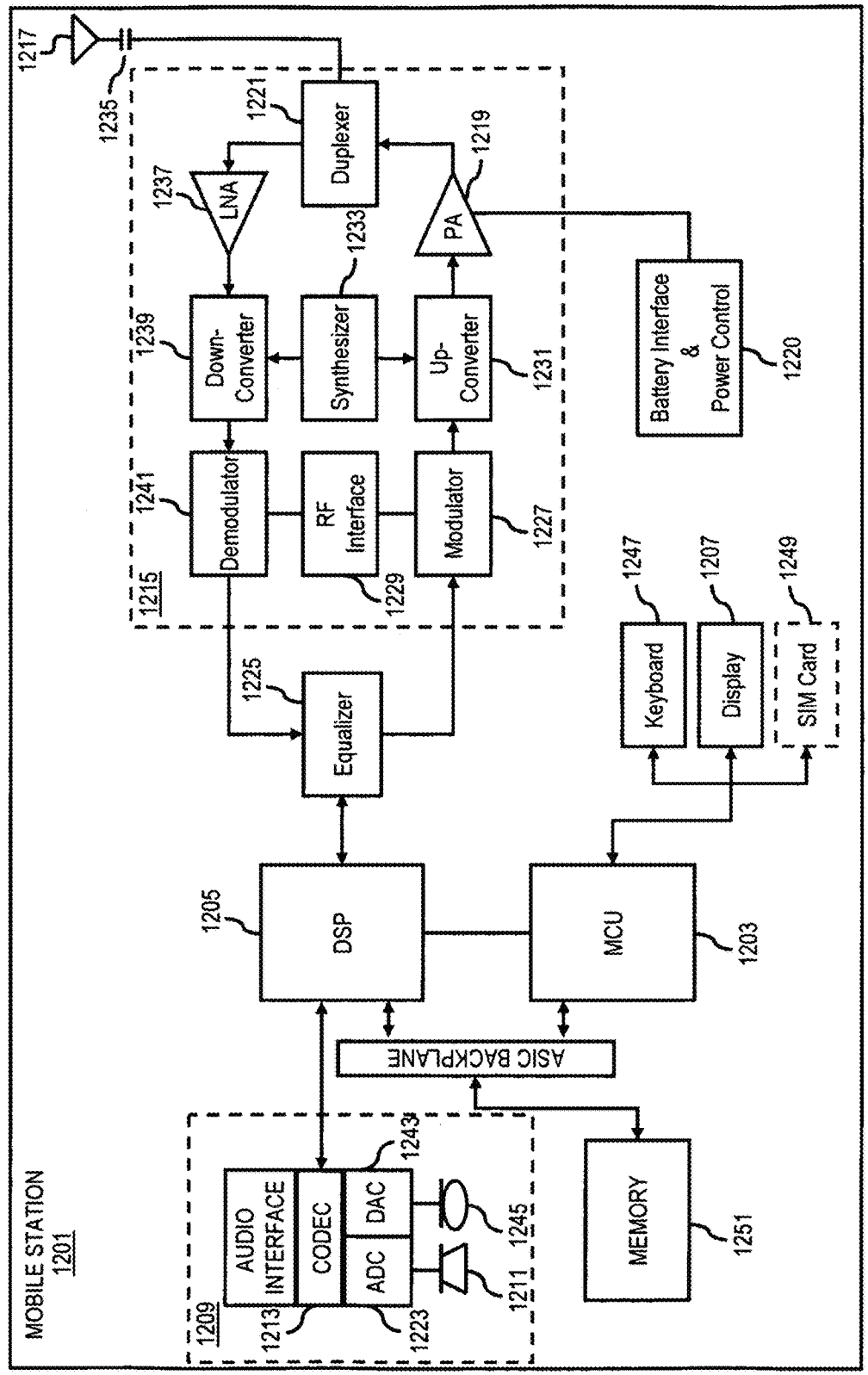
FIG. 12 is a diagram of a mobile station (e.g., handset) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to guide the capturing of seamless media. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A guided media capture method, comprising:
    capturing, with user equipment, one or more media content items for a location-based sequence of media, comprising:
        sensing location information about the user equipment, the location information comprising position and orientation of the user equipment;
        based on the sensed location information in conjunction with location information of one or more previously captured media content items, determining guidance information for the capture of a next media content item for the sequence, the determining of guidance information comprising:
            determining a distance of the user equipment from a position of a previously captured media content item; and
            detecting deviation of the distance of the user equipment from a range of distance corresponding to a trajectory based on one or more previously captured media content items;
        providing feedback at the user equipment indicating adjustment of at least one of position and orientation of the user equipment according to the guidance information by providing a cue at a user interface of the user equipment indicating an instruction to move the position of the user equipment according to the guidance information; and
        upon the adjustment of the at least one of position and orientation of the user equipment to a location, capturing a media content item with the user equipment along with corresponding position and orientation information for the captured media content item;
    uploading, from the user equipment to a platform and over a communications network, the one or more captured media content items in combination with corresponding position and orientation information;
    at the platform, processing the location-based sequence comprising the one or more captured media content items into a media presentation; and
    at user equipment, accessing the platform to view the media presentation.

2. The method of claim 1, wherein the step of determining the guidance information further comprises:
    determining a view angle of the user equipment;
    detecting deviation of the view angle from a range of angles corresponding to a trajectory based on one or more previously captured media content items; and
    and wherein the step of providing feedback at the user equipment further comprises:
    providing a cue at a user interface of the user equipment indicating an instruction to adjust the orientation of the user equipment according to the guidance information.

3. The method of claim 1, wherein the step of determining the guidance information is performed at the user equipment.

4. The method of claim 1, wherein the step of determining the guidance information is performed at the platform.

5. The method of claim 1, wherein the at least one captured media content items and the previously captured media content items each comprise an image acquired by a camera in the user equipment.

6. The method of claim 5, wherein the first and second media content items each further comprise audio.

7. A mobile device, comprising:
    at least one processor;
    a media module;
    a location module;
    an orientation module;
    a user interface;
    an application platform interface; and
    memory, for storing computer program code that, when executed by the at least one processor, causes the mobile device to perform a plurality of operations comprising:
        capturing one or more media content items for a location-based sequence of media, by:
            sensing position and orientation information of the device with the location module and orientation module, respectively;
            determining guidance information for the capture of a next media content item for the sequence, based on the sensed position and orientation information in conjunction with position and orientation information of one or more previously captured media content items, the determining of guidance information comprising:
  determining a distance of the device from a position of a previously captured media content item; and
  detecting deviation of the distance of the device from a range of distance corresponding to a trajectory based on one or more previously captured media content items;
providing feedback at the user interface indicating adjustment of at least one of position and orientation of the user equipment according to guidance information by providing a cue at the user interface indicating an instruction to move the position of the device according to the guidance information; and
upon the adjustment of the at least one of position and orientation of the user equipment to a location, capturing a media content item with the media module along with corresponding position and orientation information for the captured media content item sensed by the location module;
uploading to an application platform, via the application platform interface, the one or more captured media content items in combination with corresponding position and orientation information;
at the platform, processing the location-based sequence comprising the one or more captured media content items into a media presentation;
wherein the guidance information for the capture of a media content item is based on the sensed location information in conjunction with location information of one or more previously captured media content items.

8. The device of claim 7, wherein the guidance information is determined at the application platform; and wherein the plurality of operations further comprises:
  receiving the guidance information via the application platform interface.

9. The device of claim 7, wherein the operation of determining the guidance information further comprises:
  determining a view angle of the device with the orientation module; and
  detecting deviation of the view angle of the device from a range of angles corresponding to a trajectory based on one or more previously captured media content items; and
  and wherein the operation of providing feedback further comprises:
  providing a cue at the user interface indicating an instruction to adjust the orientation of the user equipment according to the guidance information.

10. The device of claim 7, wherein the media module comprises a camera;
  and wherein the at least one captured media content items each comprise an image acquired by a camera in the user equipment.

11. The device of claim 10, wherein the media module further comprises an audio recorder;
  and wherein the at least one captured media content items each further comprises audio.

12. The device of claim 7, wherein the plurality of operations further comprises:
  receiving, via the application platform interface, the media presentation including the at least one captured media content items arranged in a spatial relationship with one another; and
  presenting the media presentation for viewing at the user interface.

* * * * *